Figure 1:
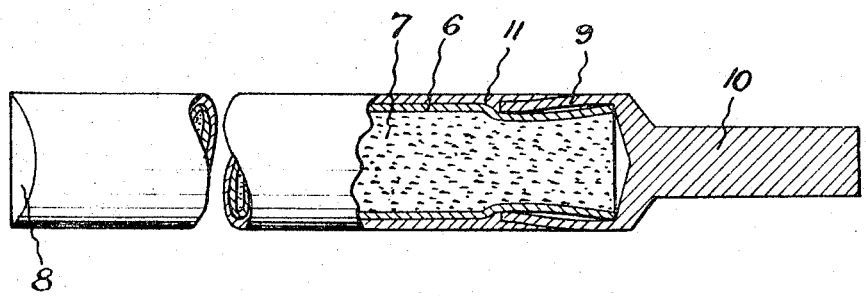

Jan. 3, 1967 D. G. HOLLOWAY ET AL 3,296,414

WELDING ROD

Filed Feb. 6, 1964

INVENTORS:
DAVID G.
HOLLOWAY
CEDRIC V.
WHITEHOUSE

Browne, Schuyler & Beveridge
ATTORNEYS

United States Patent Office 3,296,414
Patented Jan. 3, 1967

3,296,414
WELDING ROD
David George Holloway, Yowie Bay, near Sydney, and Cedric Victor Whitehouse, Beverley Park, near Sydney, New South Wales, Australia, assignors to Vida-Weld Pty. Limited, Taren Point, near Sydney, New South Wales, Australia
Filed Feb. 6, 1964, Ser. No. 342,976
Claims priority, application Australia, Feb. 22, 1963, 27,693/63
2 Claims. (Cl. 219—146)

This invention relates to welding rods or electrodes as used in electrical welding operations; and more particularly, to those welding rods which consist of a sheet-metal tube packed with core material being weld metal constituents usually in the form of a powder.

Hitherto, to make a welding rod (of the kind referred to above) of convenient length, a stock length of the packed tube is pinched off at intervals thus to divide it into convenient rod lengths, and also to close the ends of each rod tube so as to prevent loss of core material. When these rods are of small diameter (about 1/4" or less) they present no difficulty so far as holding them is concerned, because they are small enough to be easily grasped in the welder's electrode holder; but, when the diameter of the welding rods is larger (such as 3/8" or 1/2"), it is difficult for the welder to maintain a firm grip of the rod.

To assist in this regard, it has been proposed, near one end of a rod of the kind in question, to press a somewhat flattened gripping portion; but while this expedient reduces the thickness of the tube in one dimension, it does not do so at right angles to that direction, and thus, although the rod when grasped about the flattened portion will somewhat less readily slip from an electrode holder, the situation is not greatly improved.

The object of this invention is to overcome the mentioned disability in an extremely simple way which avoids the necessity for one end of a welding rod to be pinched in order to close it; and also, enables virtually the entire length of the tube containing the core material to be usefully employed, as distinct from the present practice in which about an inch of the packed tube cannot be effectively used because that much is required for taking a grip thereon with a holder.

The last-mentioned advantage may not seem great, but it has to be realised that with most welding rods the core materials frequently include expensive alloying ingredients, and thus to avoid loss of the amount of core material which would fill only about an inch of the tube is not without economic importance. It is customary for welding rods of the kind under discussion to be made of a convenient length (usually not exceeding about 18 to 20 inches) and thus it will be seen that even under those circumstances the indicated saving of core material is of the order of from 5 to 6 percent.

The invention may be summarised as an electric welding rod of the kind consisting of a tube closed at both ends and packed with core material, characterised in that one end of the tube is closed by one end of a stem fixedly adjoined to the tube, the maximum lateral dimension of the stem being less than that of the tube, and the length of the stem sufficient for it to be gripped in a welding electrode holder.

Examples of the invention are illustrated in the drawings herewith.

FIGS. 1 to 4 respectively show, in partly sectioned side elevation and with most of the rod length broken away, four different embodiments of the invention.

Figure 4:
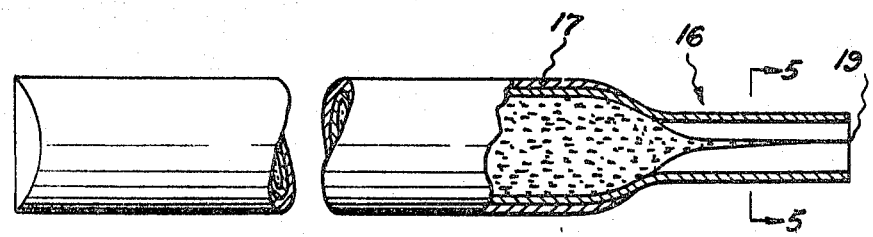
Figure 5:

FIG. 5 is a sectional end elevation taken on line 5—5 in FIG. 4.

The rod shown in FIG. 1 consists of a tube 6 which is preferably a longitudinally lap-jointed sheet-metal tube. It is packed with any suitable core material 7 and is closed at one end in any convenient manner; for example by pinching as indicated at 8. The other end of the packed tube is closed by a neat-fitting thimble or cap 9, pressed thereon with sufficient tightness as to ensure against dislodgement from the tube end. The floor of the cap has a stem 10, preferably integral therewith, which is of such diameter (say 3/16 to 1/4 of an inch) as to permit it being readily and firmly grasped by a welder's electrode holder. The cap is preferably made from a metal which may be suitably used up as weld metal thus leaving only the small diameter holding stem as representing unavoidable metal loss.

Although the cap may be held on the tube simply by being a tight fit thereon; if desired, it may be applied to the end of the tube without being a particularly tight fit thereon, and simply retained thereon by being sidewardly pressed sufficiently to take a tight hold upon the tube. Alternatively, the thimble or cap can be spot or otherwise welded to the tube. The tube may be coated with a fluxing material as indicated at 11.

Figure 2:
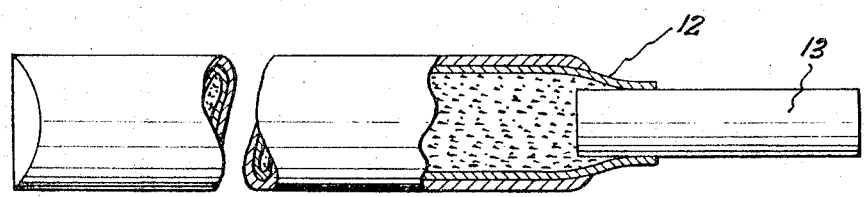

The rod shown in FIG. 2 has its stemmed end reduced by swaging or the like as indicated at 12. The stem 13 is a tight fit in the reduced end and is fixedly adjoined thereto by welding or otherwise, or simply by being a very tight fit in the reduced end of the tube.

Figure 3:
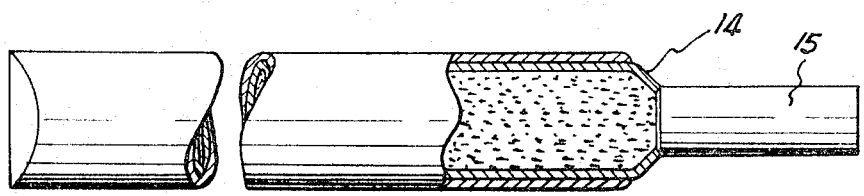

The rod shown in FIG. 3 has its stemmed end inturned as shown at 14, and the stem 15 is simply butt welded to the inturned end.

It will be seen that in the constructions of FIGS. 1 to 3, the tube ends are closed by the stem ends contiguous thereto, and that the stems (as shown in FIG. 1) are solid in the sense of being non-tubular. These features of contiguous closure, and solidity in the sense indicated, are preferred but not essential. Contiguous closure is preferred because it means that none of the core material is wasted by being present inside the stem. Solidity is preferred because it is easier to make the stems that way; obviously, the stems could be tubular so long as the tubular bore is not open at both ends.

In the rod shown in FIGS. 4 and 5 the stem 16 is fixedly adjoined to the tube 17 by being integral therewith, and is formed with longitudinal depressions 18 which, at least at one point (such as the end 19, FIG. 4) are pressed together to constitute a closure for the tube. In such case the end of the tube is closed by that end of the stem which is remote from the tube as distinct from contiguous thereto; also, the stem will not be solid in the sense of that term as used above, inasmuch as some small space will, or may, be left therein into which core material may enter.

As a rule the tubes, such as 6 or 17, will be of circular cross-sectional shape, but they are not necessarily of that shape. They may be of elliptical or other non-circular cross-sectional shape, but in all cases the diameter or like maximum lateral dimension of the stem will be less than the similar dimension of the tube adjoined thereto.

We claim:
1. An electric welding rod comprising in combination, a metal tube closed at both ends and packed from end-to-end with granular core material, a separately formed closure cap at one end of said tube, said cap having a base extending over said one end of the tube and a side wall extending along and embracing peripheral portions of the tube at said one end thereof to fixedly secure the cap on the tube, an axially projecting stem on and integral with said cap, said stem having a maximum lateral dimension less than that of the tube and a length sufficient for it to be gripped in a welding electrode holder, said cap being made from metal and said side wall of the cap being deformed inwardly into tight engagement with said peripheral portions of the tube, and an external layer of flux material covering the tube and portions of the cap.

2. The electric welding rod defined in claim 8 wherein said stem has an overall thickness of approximately 3/16 to 1/4 inches.

References Cited by the Examiner

UNITED STATES PATENTS

| | | | |
|---|---|---|---|
| 1,825,829 | 10/1931 | Stoody et al. | 219—145 |
| 1,857,521 | 5/1932 | Stressau et al. | 219—146 |
| 2,520,112 | 8/1950 | Bourque et al. | 219—146 |
| 2,531,005 | 11/1950 | Smith | 219—146 |
| 3,023,130 | 2/1962 | Wasserman et al. | 219—146 X |

RICHARD M. WOOD, *Primary Examiner.*

R. F. STAUBLY, *Assistant Examiner.*